United States Patent [19]

Adamson et al.

[11] Patent Number: 5,717,863
[45] Date of Patent: Feb. 10, 1998

[54] METHOD AND APPARATUS FOR MANAGING PC CONFERENCE CONNECTION ADDRESSES

[75] Inventors: Peter Adamson, Portland; Puneet Kukkal, Hillsboro, both of Oreg.

[73] Assignee: Intel Corporation, Santa Clara, Calif.

[21] Appl. No.: 534,472

[22] Filed: Sep. 27, 1995

[51] Int. Cl.$^6$ .................................................. G06F 15/16
[52] U.S. Cl. ........................... 395/200.34; 395/200.75
[58] Field of Search ........................ 395/200.04, 200.34, 395/963, 705, 705.08, 330, 200.75

[56] References Cited

U.S. PATENT DOCUMENTS

| | | | |
|---|---|---|---|
| 4,953,159 | 8/1990 | Hayden | 370/62 |
| 5,195,086 | 3/1993 | Baumgartner | 370/62 |
| 5,317,683 | 5/1994 | Hager | 395/145 |
| 5,500,929 | 3/1996 | Dickinson | 395/160 |
| 5,533,110 | 7/1996 | Pinard | 379/201 |
| 5,546,447 | 8/1996 | Skarbo | 379/142 |
| 5,572,582 | 11/1996 | Riddle | 379/202 |
| 5,590,128 | 12/1996 | Maloney | 370/260 |

*Primary Examiner*—Eric Coleman
*Attorney, Agent, or Firm*—Blakely, Sokoloff, Taylor & Zafman

[57] ABSTRACT

Each PC conferencing application of a plurality PC conferencing systems is equipped with an enhanced profile function including the ability to allow a user to designate a personal address book, and a corporate address book. Each PC conferencing application is further equipped with functions for modeling exchange of business cards, including functions for creating, editing, sending, receiving, saving, and browsing electronic business cards. As an integral part of the bizcard create and edit process, each create and edit function causes an address record including a user's PC conference connection addresses to be populated in the designated corporate address book when a bizcard is created, and the address record to be updated whenever the bizcard is updated. The various designated corporate address files are automatically synchronized. As a result, as an integral part of the bizcard create and edit process, PC conference connection addresses are automatically made available and maintained throughout the organization across geographical boundaries. Additionally, to further facilitate the physical or logical relocation of a user, conference connection addresses are maintained in the personal and corporate address books in a location independent format.

23 Claims, 14 Drawing Sheets

5,717,863

METHOD AND APPARATUS FOR MANAGING PC CONFERENCE CONNECTION ADDRESSES

BACKGROUND OF THE INVENTION

1. Field of the Invention

The present invention relates to the field of personal computer (PC) conferencing. More specifically, the present invention relates to the management of PC conference connection addresses.

2. Background Information

PC conferencing including both data and/or video conferencing are known in the art. Presently as it is known in the art, management of connection addresses including collection and organization are the responsibilities of the individual conferencing systems. In other words, if a user of a conferencing system wants to avoid having to enter a connection address each time a connection attempt is made, it is his/her responsibility to collect and organize the connection addresses of the potential callee systems.

Typically, a conferencing application would include a function for maintaining a dial list comprising the connection addressees of the potential callees. The connection addresses are either pre-entered by the user or collected from prior conferences. Pre-entered connection addresses are typically organized alphabetically by the potential callees' names, whereas connection addresses collected from prior conferences are typically organized in the order "last dial". Either case, the connection addressees are typically maintained in location dependent forms including the location dependent prefixes, e.g. "9" for getting an outside line, commas for pausing, and "1" for dialing long distance.

To initiate a connection using one of the collected connection addresses, the user would open the dial list, scroll to the desired "most recent dialed" number or callee name, select the connection number/name, and instruction the conference manager to establish the desired connection.

As advances in technology continue to improve the affordability of high performance PCs suitable for data and/or video conferencing, increasing number of PCs are equipped with the capability. Thus, users who regularly conferences with different participants have found their dial lists getting increasing lengthy and more difficult to find the desired connection address. One obvious solution is to employ certain aging process to delete the "older" connection addresses, thereby keeping the dial list more manageable and easier to scroll to the desired connection address. However, the obvious disadvantage is that infrequently used connection addresses will be lost. Thus, it is desirable to have a more user friendly approach to managing connection addresses.

At the same time, advances in communication technology have also made available a variety of transports over which the conferences can be conducted. For example, the connections may be through "plain old telephone services" (POTS), local area network (LAN), integrated service data network (ISDN), etc. Thus, it is no longer unusual for a user to be equipped with multiple transport capabilities, resulting in having multiple connection addresses. However, even though a user might have multiple transport capabilities, often time, the user has a preferred transport for conducting conferences. Thus, it is further desirable if the more user friendly approach to managing connection addresses can also reflect a callee's connection preference.

Additionally, increasing number of medium to large size corporations/organizations have found themselves having a substantial "internal" user population equipped with PC conferencing capability. For these corporations/organizations, the problem is further complicating by the fact that their user population tend to move around among the various geographical sites of the corporations/organizations, resulting in frequent changes to user connection addresses, as well as rendering the relocated users' dial lists non-functional (because of the connection addresses being maintained in location dependent forms). Thus, it is further desirable if the more user friendly approach to managing connection addresses can also accommodate geographic movement of "internal" user populations.

As will be described in more detail below, the present invention achieves these and other desired results.

SUMMARY OF THE INVENTION

Each PC conferencing application of a plurality PC conferencing systems is equipped with an enhanced profile function including the ability to allow a user to designate a first file as a personal address book, and a second file as a corporate address book. In one embodiment, the PC conferencing systems are geographically dispersed in a plurality of sites. Under the embodiment, each first file is a local file in certain local storage of the system executing the conferencing application, whereas the second file is a mapped file in certain storage of a remote server coupled to the system.

Each PC conferencing application is further equipped with functions for modeling exchange of business cards, including functions for creating, editing, sending, receiving, saving, and browsing electronic business cards, which are data structures containing information commonly found on business cards and PC conference connection addresses. The bizcard data are rendered in a format that resembles a physical business card. As an integral part of the bizcard create and edit process, each create and edit function causes an address record including a user's PC conference connection addresses to be populated in the designated corporate address book when a bizcard is created, and the address record to be updated whenever the bizcard is updated. As an integral part of the bizcard sending and receiving process, received bizcards are saved into the personal address books.

For the embodiment where the designated corporate address books reside on remote servers, the remote servers are equipped with complementary file drivers for automatically synchronizing the designated corporate address books. As a result, as an integral part of the bizcard create and edit process, PC conference connection addresses are automatically made available and maintained throughout the organization across geographical boundaries.

Additionally, to further facilitate the physical or logical relocation of a user, conference connection addresses are maintained in the personal and corporate address books in a location independent format. Each conferencing application is further provided with an enhanced connect function including in particular, the ability to add the appropriate location dependent information and local "prefixes" to a location independent connection address, whenever the location independent connection address is used to initiate connection to a callee.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
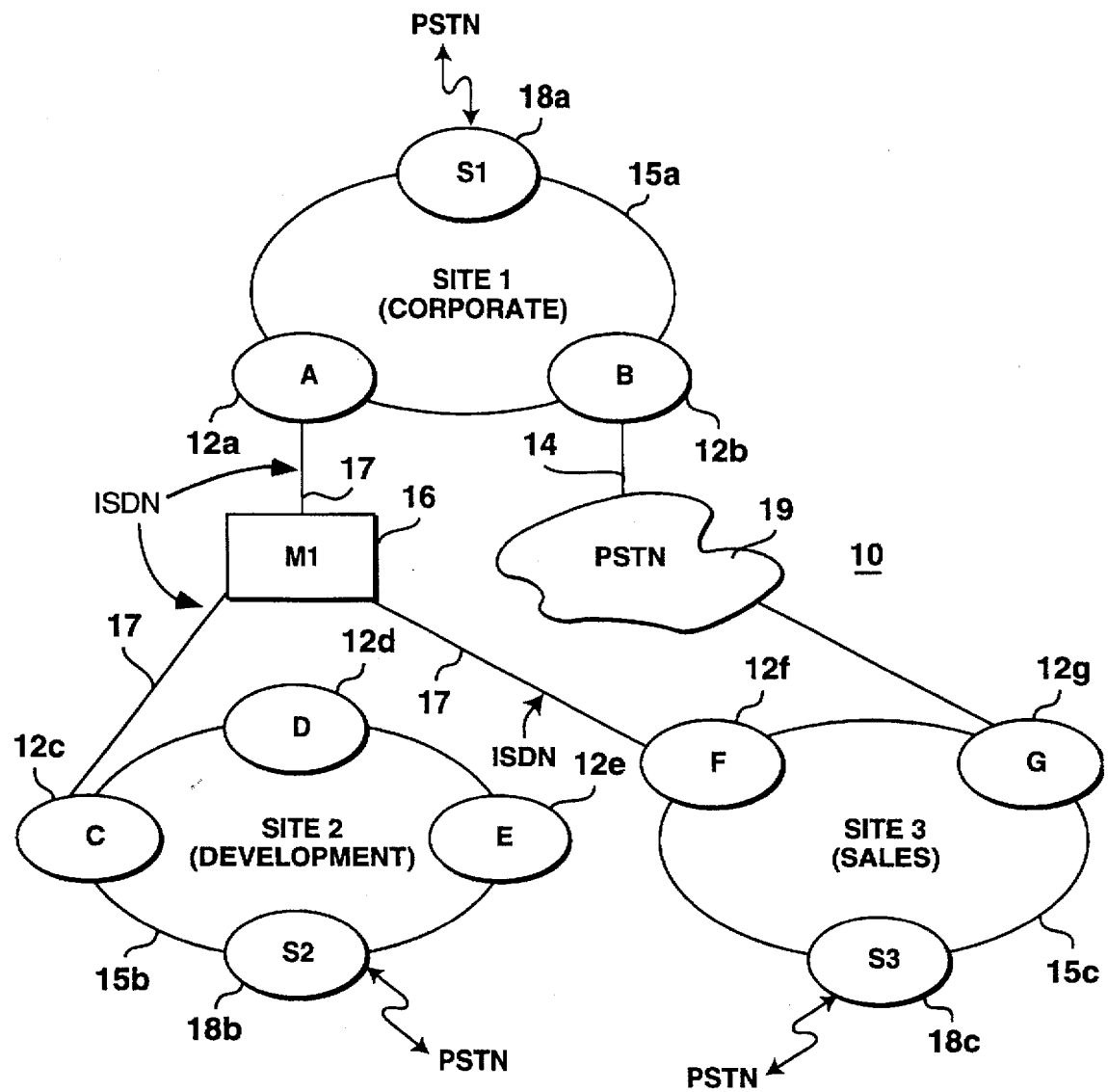
FIG. 1 illustrates an exemplary "intra-organizational" network of PCs and servers incorporated with the teachings of the present invention.

Referring now to FIG. 1, an exemplary "intra-organizational" network of PCs and servers incorporating the teachings of the present invention is shown. The exemplary "intra-organizational" network 10 includes multiple geographically dispersed PCs 12a–12g and servers 18a–18c. For illustrative purposes, PCs 12a–12b and server 18a are geographically located in a first "corporate" site, PCs 12c–12e and server 18b are located in a second "development" site, and PCs 12f–12g and server 18c are geographically located in a third "sales" site. PCs 12a–12b, 12c–12e, 12f–12g and servers 18a, 18b, 18c are coupled to each other at their corresponding sites via LAN 15a, 15b and 15c respectively. Additionally, PCs 12a–12g and servers 18a–18c are coupled to each other across sites from time to time via connections such as ISDN, POTS and the like.

PCs 12a–12g selectively engage each other in data and/or video conferences. For illustrative purpose, PC 12a, PC 12c, and PC 12f are shown to be engaged in a multiple point data and video conference via MCU 16 and ISDN connections 17, whereas PC 12b and PC 12g are engaged in a point-to-point data conference via a POTS connection 19. As a further example, PC 12d and PC 12e are engaged in a point-to-point data and video conference via their LAN connection 15b. MCU 16, LAN 15a–15c, ISDN connections 17, and PSTN 19 are known in the art, and therefore will not be further described.

Before proceeding to describe PCs 12a–12g and servers 18a–18c in further detail, in particular the teachings of the present invention incorporated, it should be noted that while for ease of explanation, FIG. 1 shows only three sites with a total of 7 PCs and 3 servers, a person skilled in the art would appreciate that in real applications, particularly for "large" multi-national corporations, there are many more sites totaling thousands of PCs and hundreds of servers.

As will be described in more detail below, to facilitate the callers of PCs 12a–12g to be able to engage the callees of PCs 12a–12g in data and/or video conferences in a more user friendly manner, PCs 12a–12g are equipped with operating system services capable of mapping files and file drivers on servers 18a–18c into the logical views of their file systems respectively. Furthermore, PC 12a–12g are equipped with conferencing applications incorporated with the teachings of the present invention.

More specifically, each conferencing application of PCs 12a–12g is equipped with functions for designating a first file as a personal address book and a second file as a corporate address book. For the illustrated embodiment, the first files are correspondingly disposed on storage devices of PC 12a–12g, whereas the second files are correspondingly disposed on storage devices of servers 18a–18c.

Each conferencing application further includes functions for modeling the exchange of business cards among the conference participants of a video conference, including functions for creating, editing, sending, receiving, saving, retrieving and browsing of electronic business cards (hereinafter bizcards). A bizcard is a data structure comprising information commonly found in business cards and the particular user's PC conference connection addresses, and bizcard data are rendered in a format that resembles a physical business card. The bizcard create and edit function automatically causes an address record containing the user's PC conference connection addresses to be populated in the corporate address book as an integral part of the bizcard creation process, and the populated address record to be automatically updated whenever the user's bizcard is updated. The sending and receiving function saves the received bizcards including the PC conference connection addresses into the user's personal address book.

Servers 18a–18c are equipped with file drivers for automatically synchronizing selected files on the respective servers 18a–18c, including in particular, the designated corporate address books on the respective servers 18a–18c. As a result, as an integral part of the bizcard creation and edit process, PC conference connection addresses are automatically made available and maintained for all potential PC conference participants throughout the entire organization across geographical boundaries.

Each conferencing application further includes an enhanced connect function for connecting to a callee, including a common dialog for formulating a connection address in at least one of two modes, an enter mode and a select mode utilizing the populated and saved connection addresses in the corporate and personal address books.

To further facilitate either the physical or logical moving of PC 12a–12g among the various sites, the conference connection addresses are maintained in the corporate address books in a location independent form. The connection function of each conferencing application is further enhanced to add the appropriate location dependent information and local "prefixes" to a location independent PC conference connection address whenever it is used to initiate connection to a callee.

Except for the conferencing applications incorporated with the teachings of the present invention, PCs 12a–12g are intended to represent a broad category of high performance PCs including but not limited to PCs equipped with Intel® Architecture processors. Similarly, servers 18a–18c are intended to represent a broad category of servers known in the art, including but not limited to servers equipped with Intel® Architecture processors. Particular examples of file drivers capable of automatically synchronizing selected files on various servers include but not limited to file drivers incorporated in commercially available products such as Lotus Note®, developed by Lotus Development Corporation of Cambridge, Mass.

Figure 2:
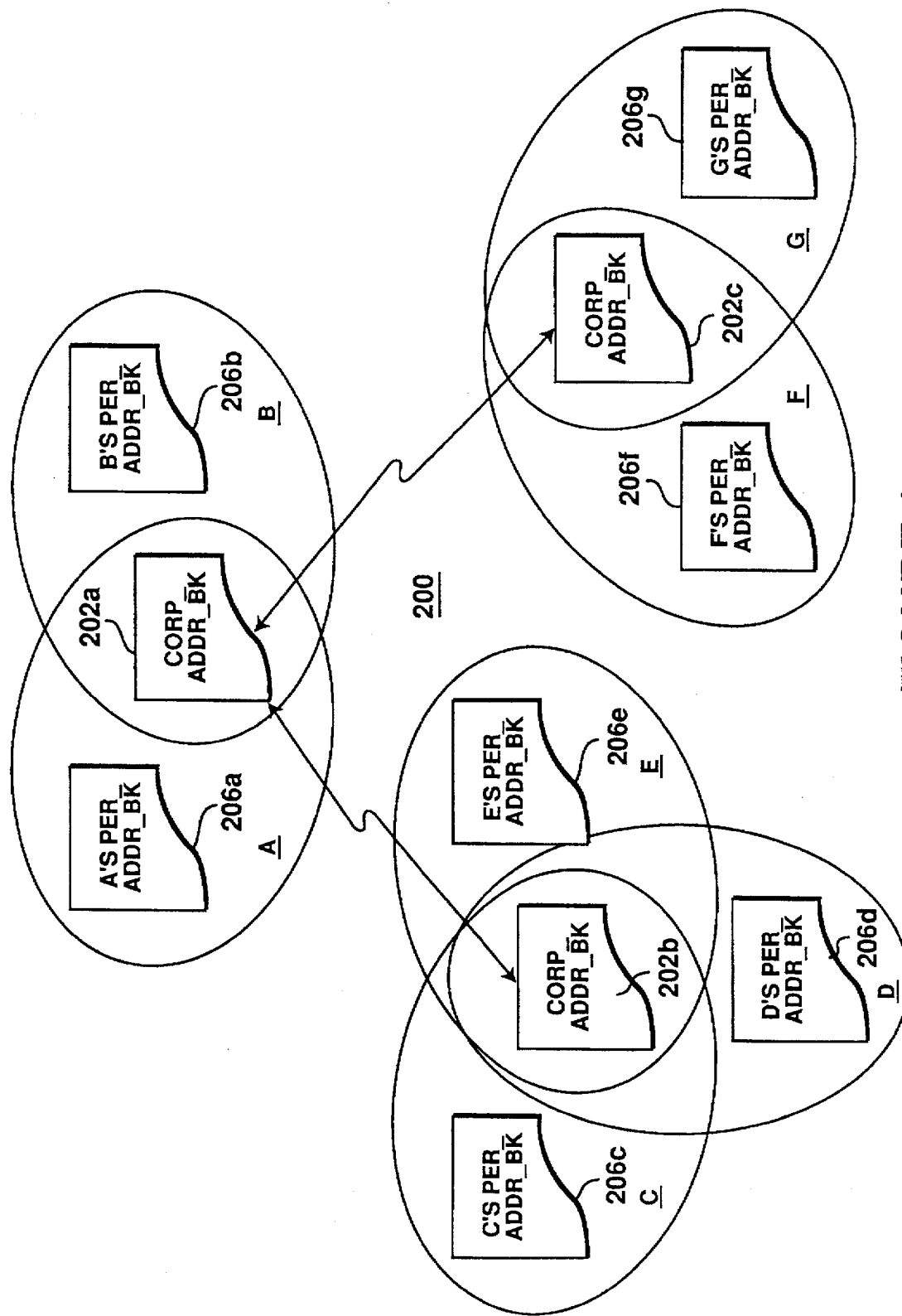
FIG. 2 illustrates the presently preferred embodiment of the address book architecture.

FIG. 2 illustrates the presently preferred embodiment of the address book architecture of the present invention. As shown, the logical view of the file system of each PC conferencing system 12a–12g includes a first file designated as the personal address book 206a–206g and a second file designated as the corporate address book 202a–202c. Under the presently preferred embodiment, the first files, i.e. personal address books 206a–206g are correspondingly disposed on certain storage devices of PC 12a–12g respectively, whereas the second files, i.e. corporate address books 202a–202c are correspondingly disposed on certain storage devices of servers 18a–18c respectively.

Each address book 202a–202c and 206a–206g comprises a plurality of address records. Address records of corporate address books 202a–202c are automatically created/updated by the bizcard create and edit functions of the conferencing applications whenever bizcards are created/updated, to be described more fully below. Furthermore, corporate address books 202a–202c are synchronized with each other automatically by file drivers included on servers 18a–18c. On the other hand, address records of personal address books 206a–206g are created and updated by the sending and receiving functions of the conferencing applications, when bizcards are received, also to be described more fully below.

While for ease of explanation, the present invention is being described with each user as having a personal and a corporate address book, based on the description to follow, a person skilled in the art will appreciated that the present invention may be practiced with an arbitrary number of address books, provided one of them is designated as the "corporate" address book for automatic propagation of connection addresses throughout the organization and the remaining ones are "designated" as the user's "personal" address books.

Figure 3:
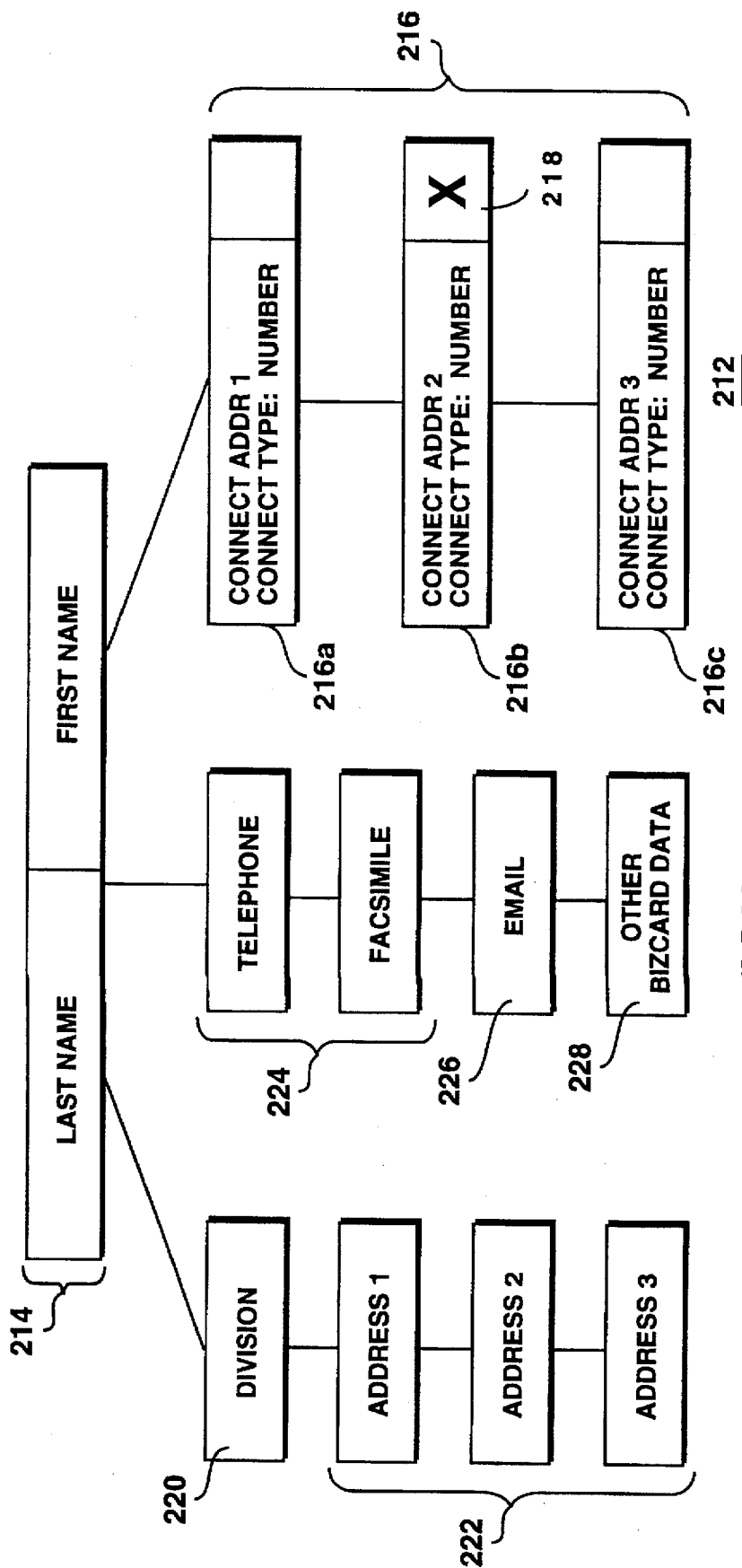
FIG. 3 illustrates the presently preferred embodiment of an address book record.

FIG. 3 illustrates one embodiment of an address record. As shown, address record 212 comprises at least identification information of the addressee, e.g. the addressee's last name and first name 214, and connection addresses 216 for the various transports supported by PC 12a–12g. For examples, the connection address for ISDN, the connection address for LAN, and the connection address for POTS. Each connection address, e.g. 216a, comprises the connection type and the number for the particular connection type. The number is kept in a location independent form, i.e. without the location dependent information, such as area codes, and local prefixes such as "9" for getting an outside line, commas for pauses, and "1" for dialing long distance. If the addressee has multiple connection addresses 216, the preferred connection address 218 is so denoted.

Additionally, address record 212 may also include other information such as the addressee's division 220, mailing address 222, telephone numbers for voice and facsimile 224, and email address 226. Lastly, in the presently preferred embodiment, address record 212 in personal address books 206a–206d further include other bizcard data 228, to be described more fully below.

Figure 4:
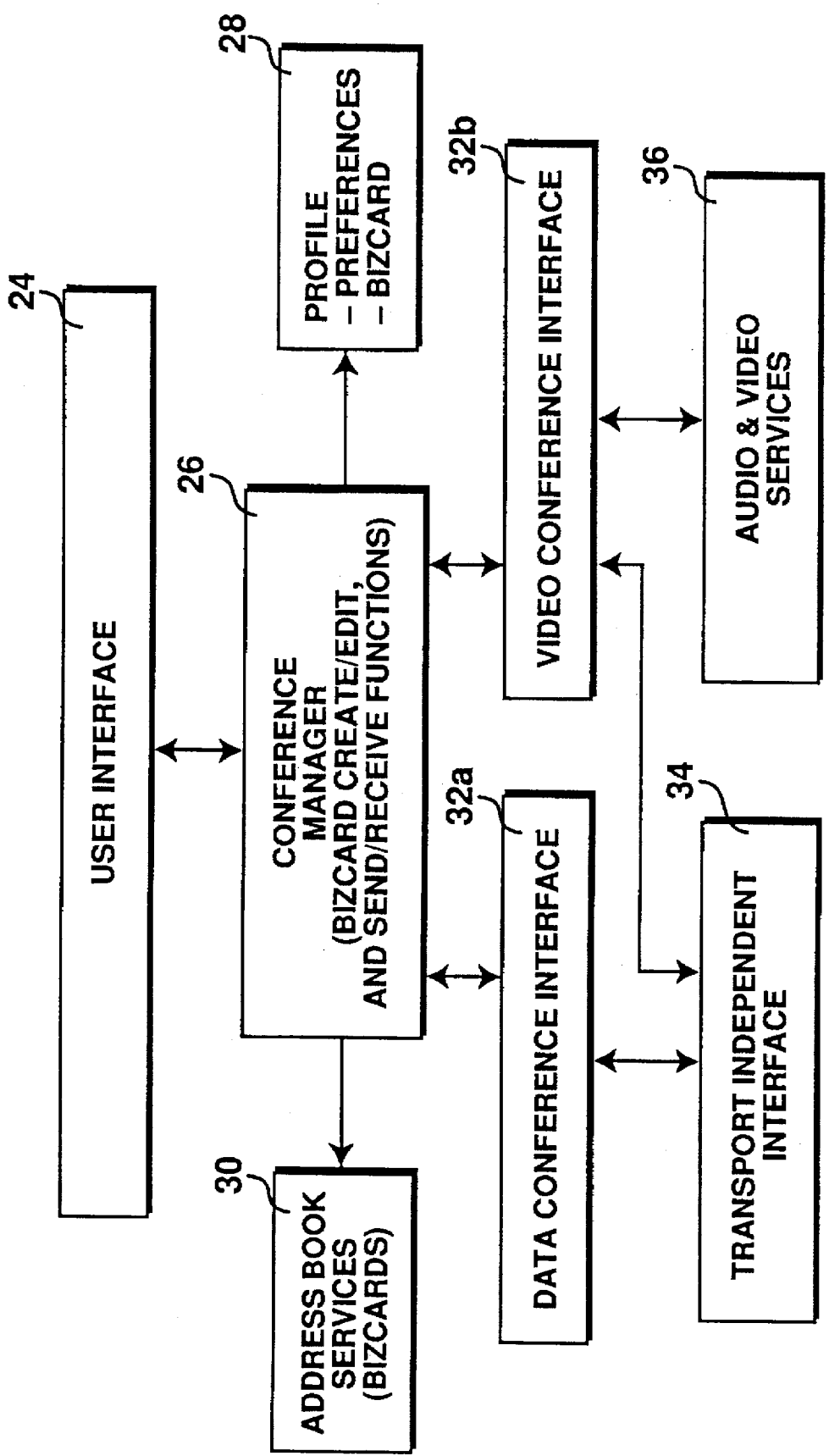
FIG. 4 illustrates the major elements of a PC conferencing application incorporated with the teachings of the present invention.

FIG. 4 illustrates one embodiment of a conferencing application incorporated with the teachings of the present invention in further detail. As shown, for this embodiment, conferencing application 22 comprises user interface 24, conference manager 26, profile data 28 and address book services 30. Furthermore, conferencing application 22 comprises transport independent services 34, extended AN services 36, and "integrated" data and video interfaces 32a and 32b to these services 34 and 36. In the presently preferred embodiment, conferencing application 22 is implemented in an object-oriented and event driven manner using the programming language C++.

User interface 24 provides display windows with menus, buttons etc. for interacting with a user. In particular, in accordance to the present invention, use interface 24 includes enhancements for facilitating set up, exchange, retrieval, browse and re-send of bizcards. Conference manager 26 manages personal conferences including the conferencing applications. In particular, conference manager 26 includes a create/edit function for creating and editing a user's bizcard. Furthermore, conference manager 26 includes a connect function for initiating a conference call to a callee PC 12a–12g or accepting a connect request from a caller PC 12a–12g. Associated with the connect function is a dial log (not shown) of most recent connections including their connection addresses. Profile 28 stores various user preferences. In particular, profile 28 includes the user's bizcard and the user's preference on whether a received bizcard is to be displayed automatically. Furthermore, profile 28 includes identification and address information of the user's personal and corporate address books 206*, and 202*, as well as location dependent information and local "prefixes" to be added to location independent connection addresses. Address book services 30 provide services related to managing the user's address books 202*/1206*. In particular, address book services 30 include services for retrieving and browsing saved bizcards. These functions and services will be described in further detail below.

Transport independent services 34 provide connection services on multiple transport media and multiple connections. A/V services 36 provide sampling, digitization, compression/decompression of audio signals exchanged, as well as capture and playback services for video streams including interfacing with the proper CODEC to compress and decompress the video signals. Integrated data and video interfaces 32a–32b provide abstraction of these transport and A/V services, enabling the serviced application to perform call management, data and/or file channel management, and AN streams management. Under the presently preferred embodiment, integrated data interface 32a supports ITU's T. 120 protocol for data conferencing, and integrated video interface 32b supports ITU's H.320 protocol for video conferencing. These and other related services are known in the art, and therefore will not be described in further detail.

Figure 5A:
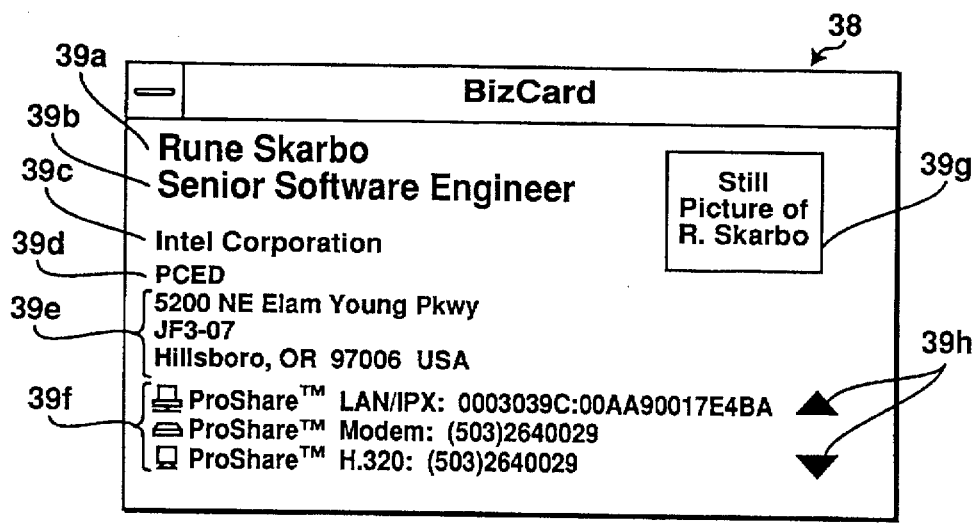
FIGS. 5a–5b illustrate the external manifestation and internal representation of a bizcard.
Figure 5B:
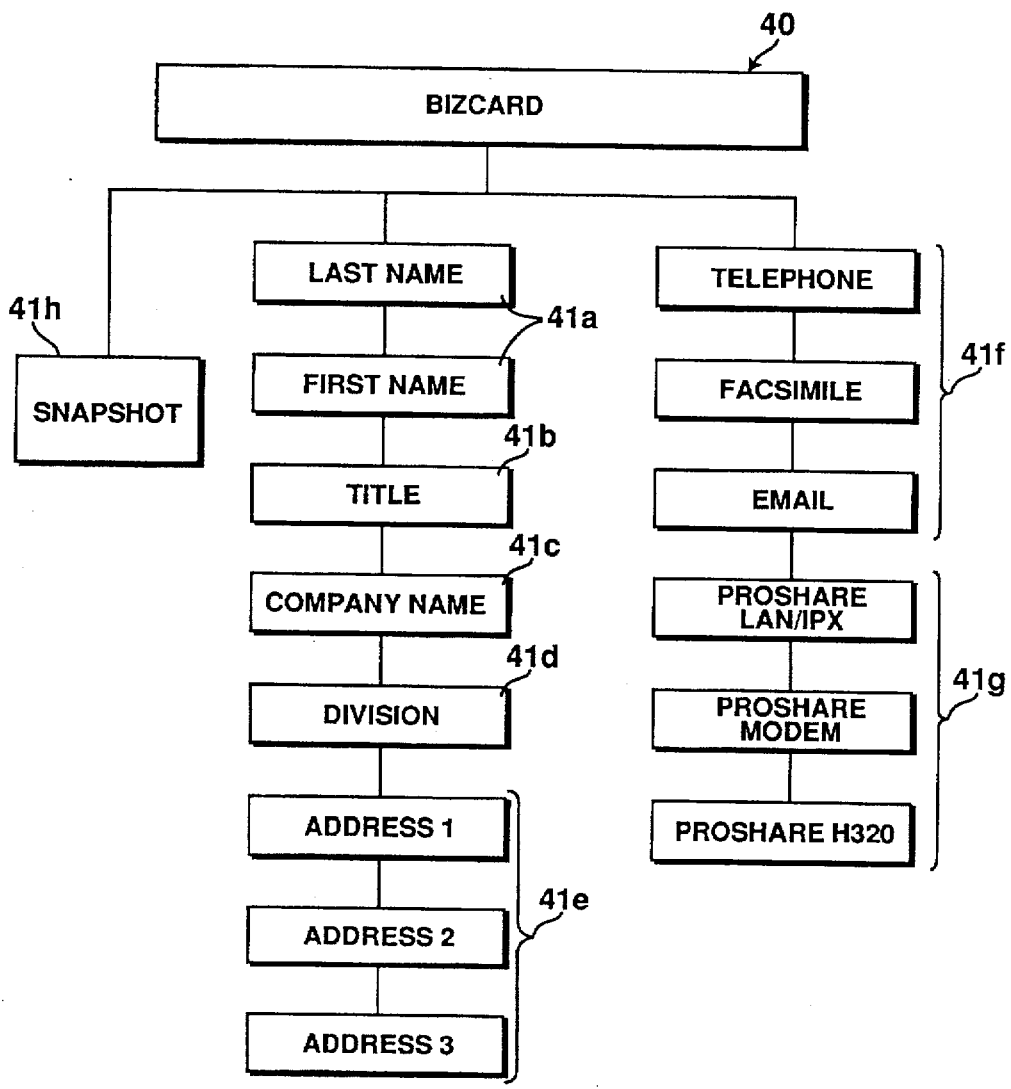

FIGS. 5a & 5b illustrate the external manifestation and internal representation of a bizcard. As shown in FIG. 5a, the external manifestation is a visual representation 38 of information commonly found on physical business cards in a format that resembles that of a physical business card. These information include name 39a, title 39b, company 39c, division 39d, address 39e, numbers 39f etc. Preferably, numbers 39f include all personal conferencing phone numbers/network addresses, in addition to conventional voice and facsimile phone numbers, and the phone numbers are scrollable 39h. Furthermore, the visual presentation 38 includes a picture 39g of the person named. Alternatively, a company logo may be included. As shown in FIG. 5b, internally, the information including the data necessary to render the picture 41h are maintained in data structures 40. Data structures 40 include data elements 41a–41h necessary to store the captured information. Data necessary to render the picture 41h may be stored in any number of graphics format well known in the art.

Figure 6:
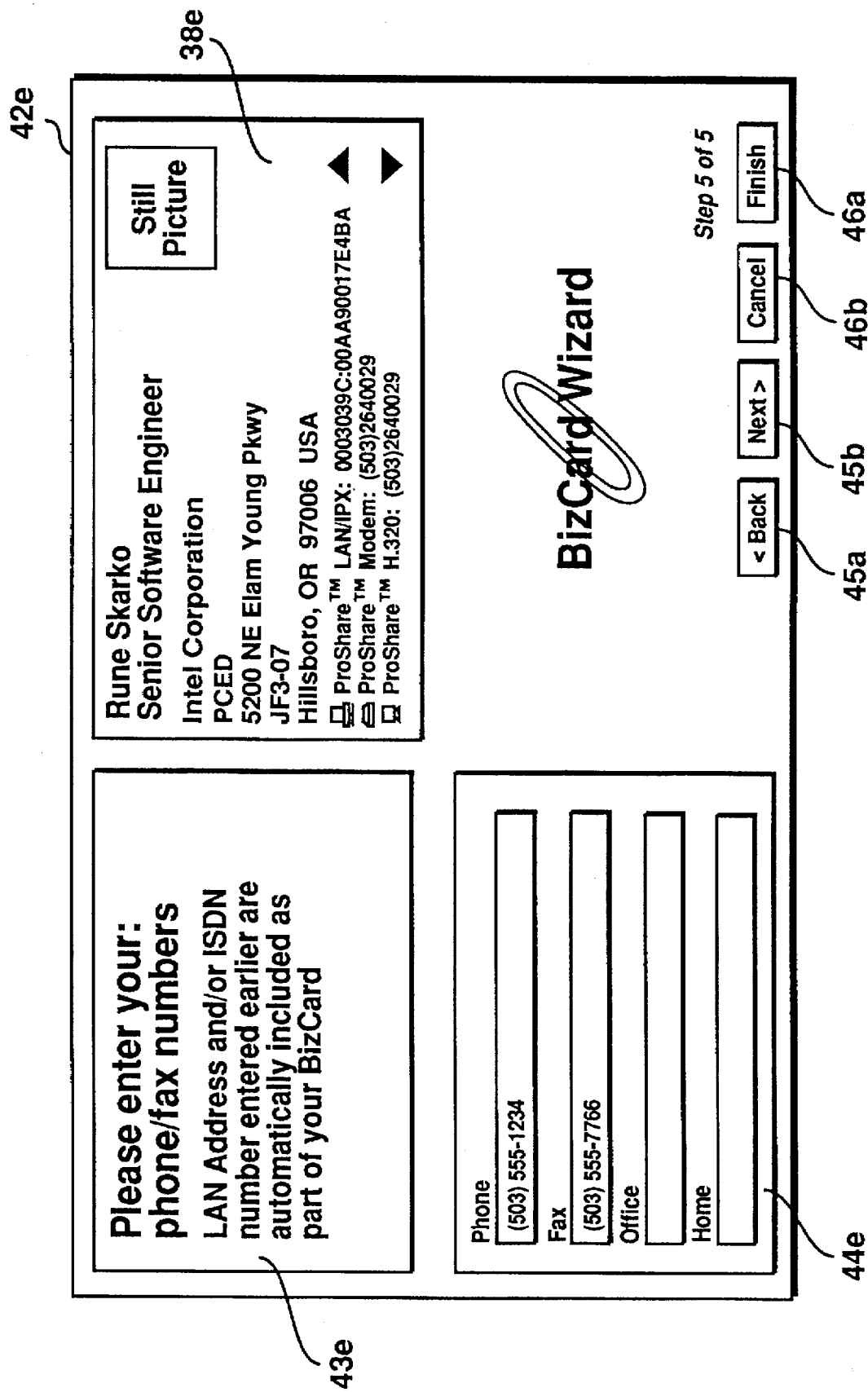
FIG. 6 illustrates one of the dialog boxes employed in the user interface for creating/editing bizcard.

FIG. 6 illustrates one of a number dialog boxes of the user interface employed by the create and edit function for creating and editing a bizcard. As shown, the exemplary dialog box 42e includes instructions to the user 43e, input areas for the user to enter data 44e, command buttons 45a–45b and 46a–46b, as well as the resulting bizcard 38e. The end user interface and base operations of the create and edit function is described in detail in copending U.S. patent application, Ser. No. 08/444,020, filed on May 18, 1995, assigned to the assignee of the present invention, which is hereby fully incorporated by reference. Additionally, the create and edit function is further enhanced to populate an address record 212 containing the user's PC conference connection addresses in the user's designated corporate address book 202, when bizcard 38 is first created, and to update the populated address record 212 whenever it is subsequently updated.

Figure 7A:
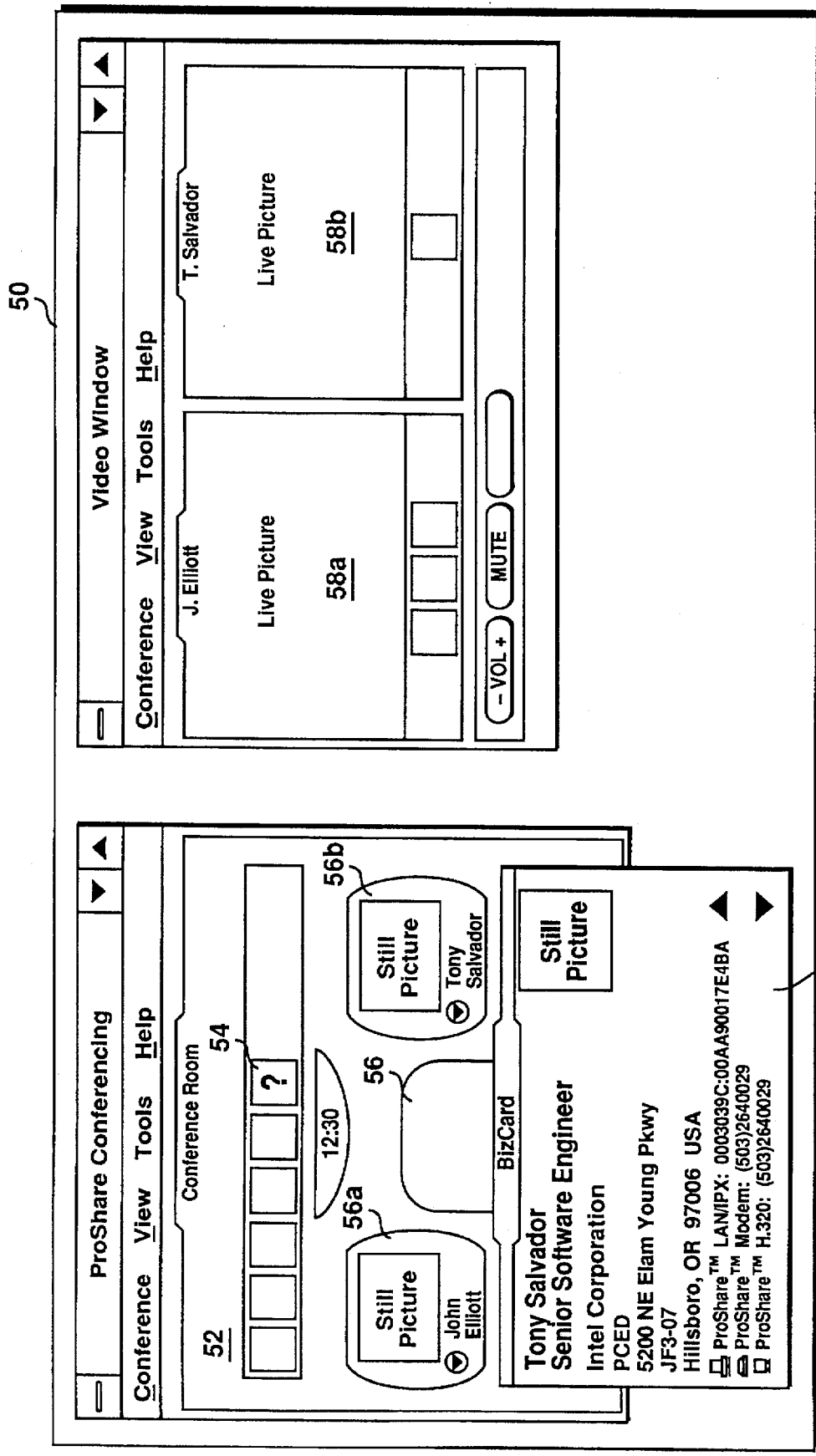
FIGS. 7a–7b illustrate exemplary usage of bizcard.
Figure 7B:
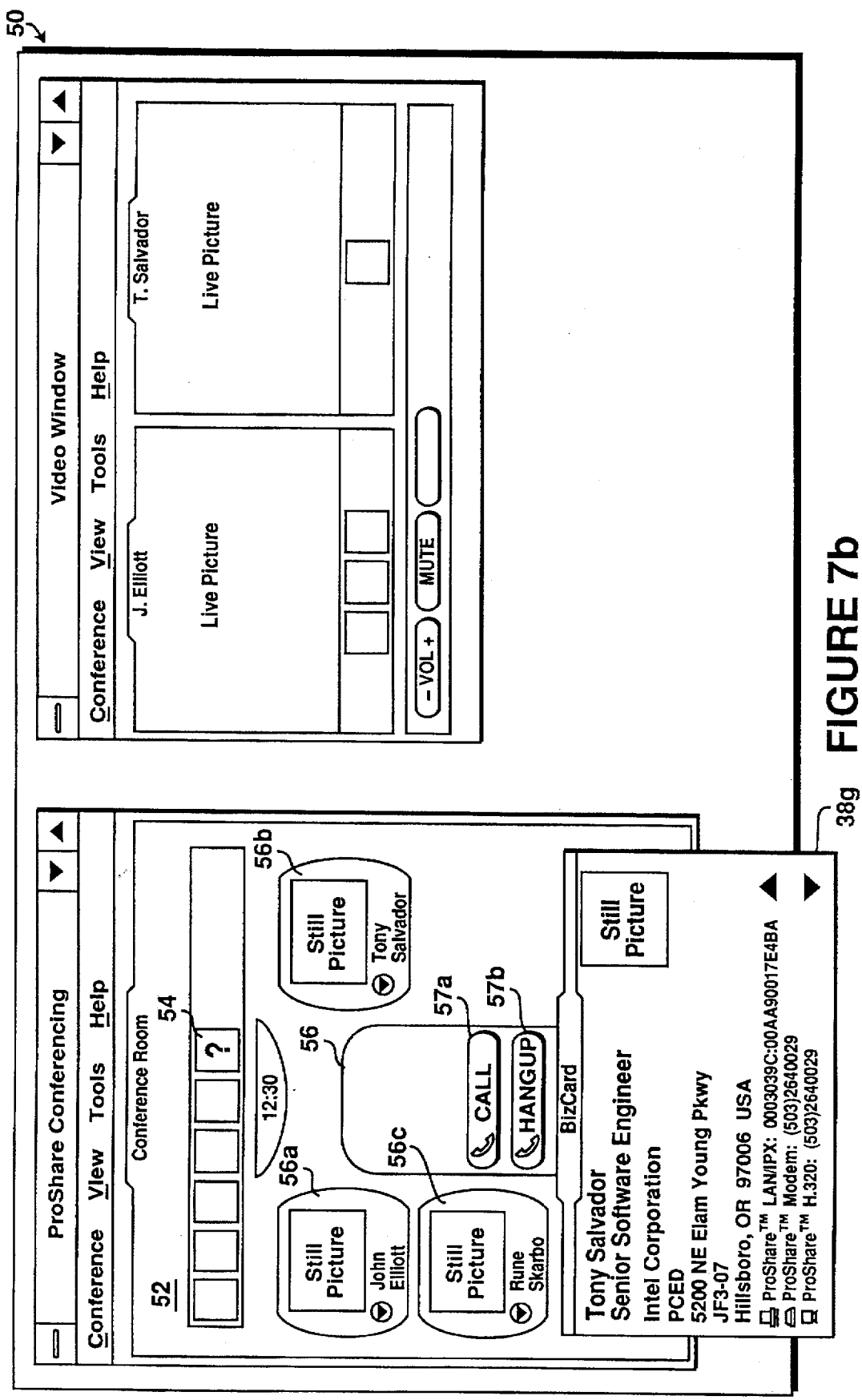

FIGS. 7a–7b illustrate one embodiment of the user interfaces employed for rendering bizcards. In particular, FIG. 7a illustrates the display of one conference participant's bizcard (Salvador) 38f at another conference participant's conference session window (Elliott) 50, when the two participants first joined together in conference. FIG. 7b illustrates the display of a "new" conference participant's bizcard (Skarbo) 38g at one of the existing conference participant's conference session window (Elliott) 50, when the "new" conference participant is joining a conference in progress (between Elliott and Salvador). As described earlier, bizcards 38f and 38g may be displayed automatically upon receipt, or bizcards 38f and 38g may be displayed upon request, using exemplary command button "?" 54, depending on the conference participant's preference setting. Preferably, notwithstanding an automatic display preference setting, exemplary command button "?" 54 may also be used to re-display the bizcard 38f or 38g of one of the conference participants, whenever the user is interested in doing so during the conference. Bizcards 38 may be exchanged among the conference participants in a number of ways, including but not limited to the embodiment disclosed in the above identified and incorporated by reference co-pending patent application.

Figure 8:
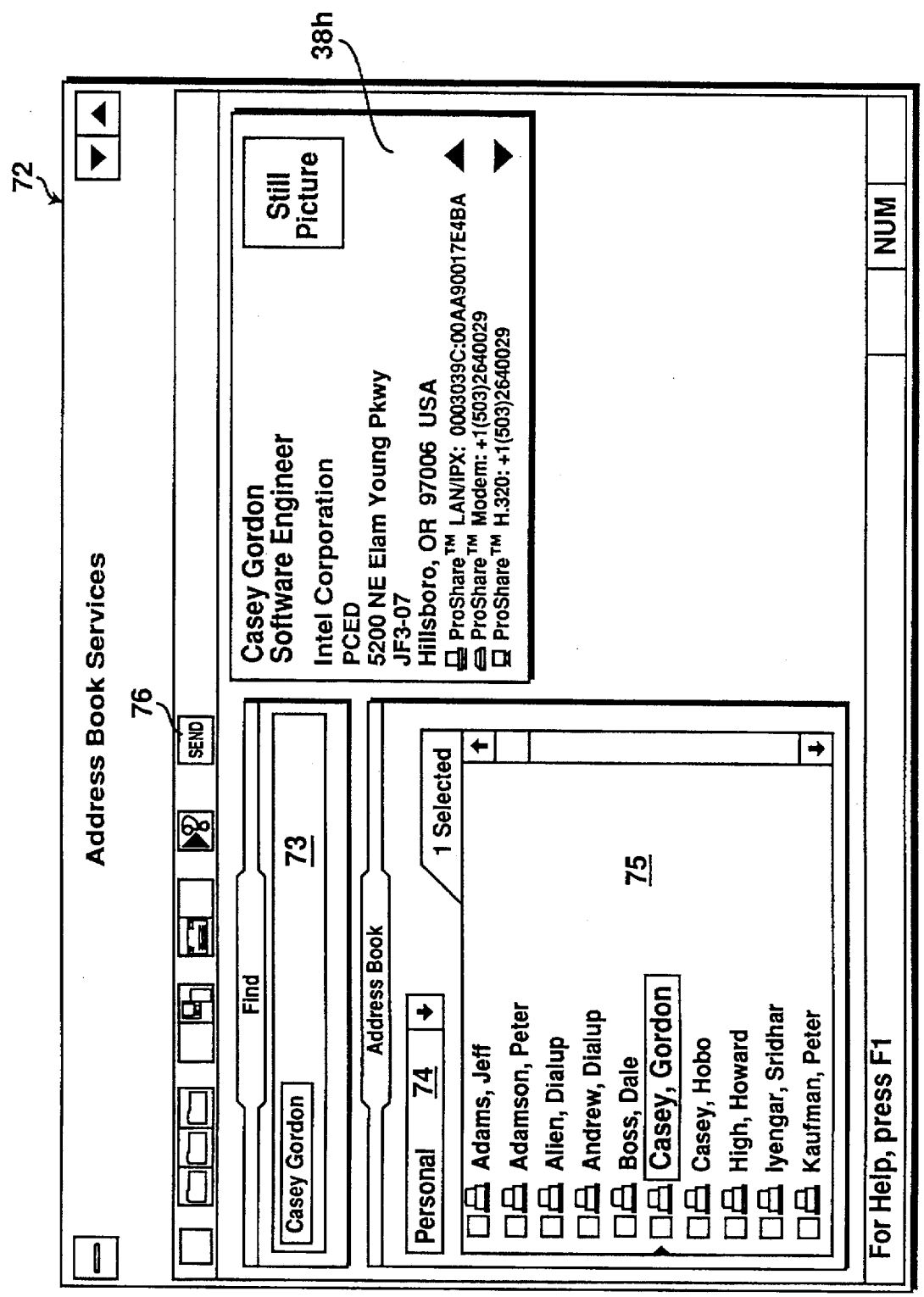
FIG. 8 illustrates one embodiment of the end user interface employed by address service for retrieving and browsing saved bizcards.

FIG. 8 illustrates the user interface employed by the functions incorporated in address book services 30 for retrieval and browsing of saved bizcards. As shown, the bizcard function of address book service 30 includes an address book/addressee selection window 72. Address book/addressee selection window 72 includes an addressee display area 75 where the user can make his/her addressee selection. As described earlier, the selected addressee is highlighted, the selected addressee's saved bizcard 38h (if it exists) is displayed. Additionally, address book/addressee selection window 72 also includes a first input area 73 for locating an addressee, and a second input area 74 for switching address book. The bizcard function of address book service 30 for retrieving and browsing saved bizcards 38h may be implemented in a variety of manners, including but not limited to the embodiment disclosed in the above identified and incorporated by reference co-pending patent application.

Figure 9:
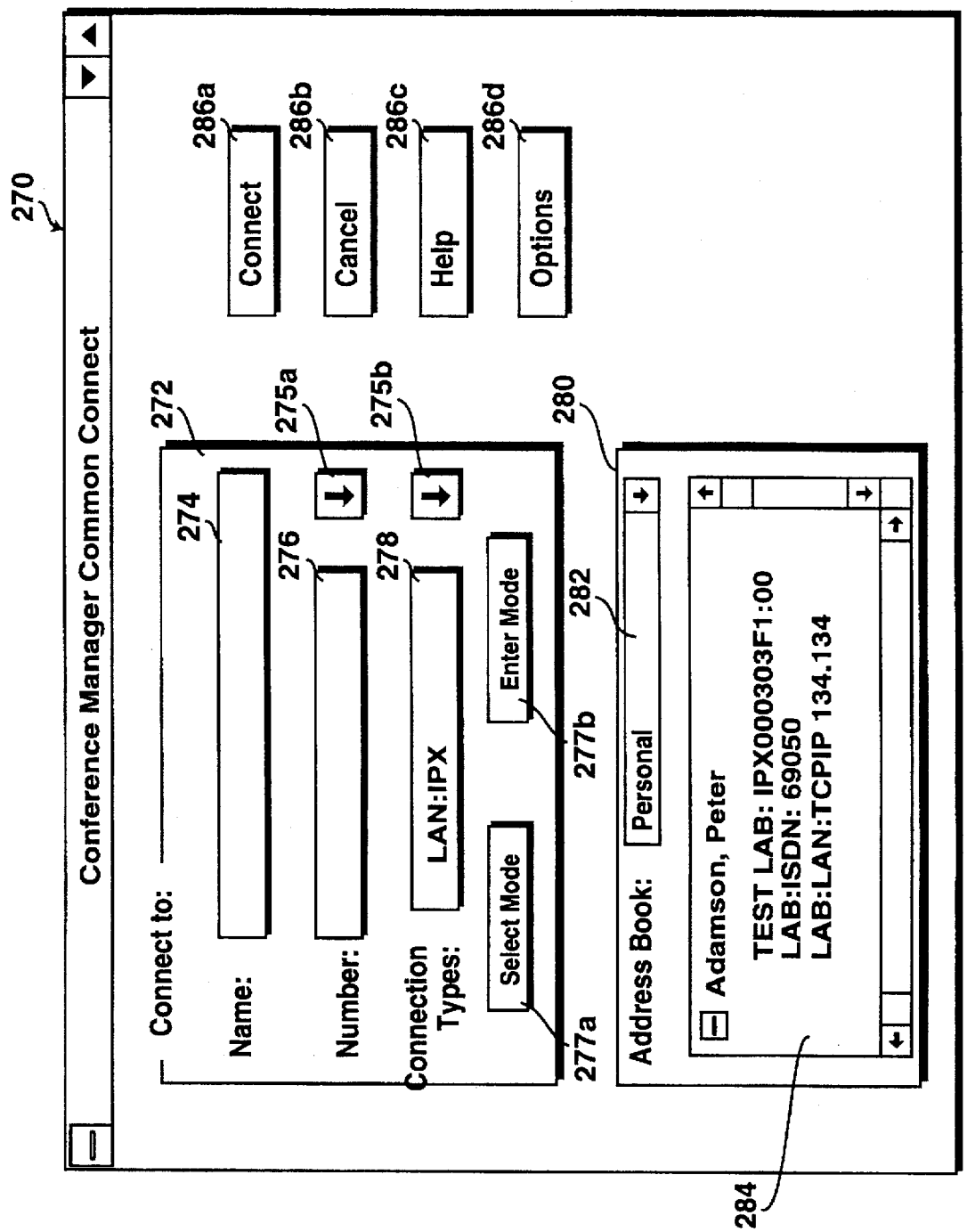
FIG. 9 illustrates one embodiment of the end user interface employed by the connect function for formulating connection addresses.

FIG. 9 illustrates one embodiment of the end user interface employed by the connect function for formulating connection addresses for connection attempts. As shown, the end user interface of the connect function comprises common connect dialog box 270 having user input area 272, display area 280, and command buttons 286a–286d. Display area 280 is used to display connection addresses of addressees 284 in a selected one of the user's address books 202*/206*. For the illustrated embodiment, the address book names 282 of the user's personal and corporate address books 202*/206* are displayed for the user as a scrollable list.

Input area 272 is used to facilitate one of two modes of formulating the connection address to be used to make a connection attempt, an enter mode and a select mode. Input area 272 includes name area 274 for entering or selecting a callee's name, number area 276 for entering or selecting a callee's connection number, and connection type area 278 for selecting a callee's connection type. Input area 272 further includes scroll buttons 275a and 275b for scrolling the connection number and type lists, and mode buttons 277a and 277b for switching modes, to be described more fully below.

Connect command button 286a is used by the user to actually initiate connection using the connection type with the connection address formulated. Other command buttons 286b–286d are used to perform their traditional roles.

Figure 10A:
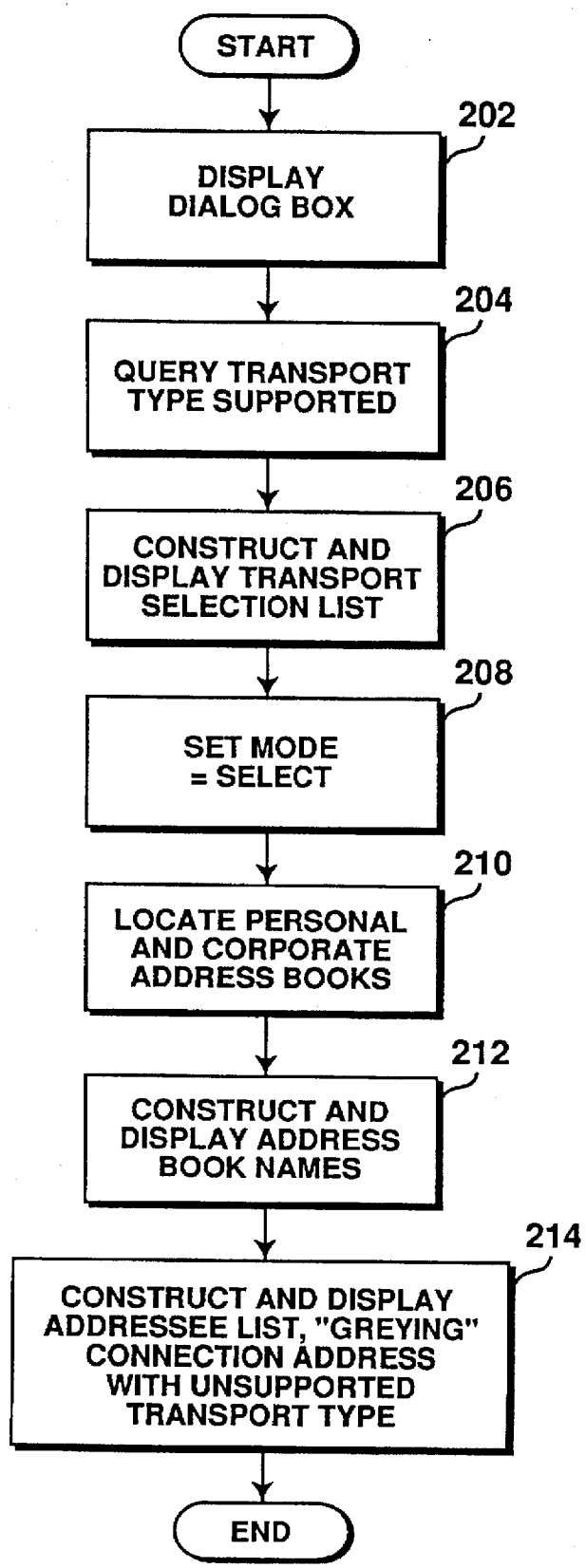
FIGS. 10a, 10b, 10c, 10d, 10e, 10f, and 10g illustrate the essential operational flow of one embodiment of the connect function for formulating connection addresses.

FIGS. 10a–10g illustrate the essential operational flow of one embodiment of the connect function for formulating connection addresses for connection attempts. As shown in FIG. 10a, upon invocation, the connect function renders the untilled display pane of common connect dialog box 270, step 202. Connect function further queries independent transport service 34 to interrogate the transport hardware to detect the transport types supported on the PC conferencing system, step 204. Upon receipt of the response(s) from transport service 34, the connect function constructs and displays the transport types supported as a scrollable list in transport type display area 278, step 206. Having set up the transport type list, the connect function sets the formulation mode to select mode, step 208, and queries address book service 30 to locate the user's personal and corporate address books 206*/202* step 210. Upon locating the user's address books 206*/202*, the connect function constructs and displays the names of address books 206a–206d as a scrollable list in address book name display area 282, step 212. The connect function then retrieves the connection addresses of the addressees in the default address book 202*/206* as a scrollable list in addressee display area 284, step 214.

Figure 10B:
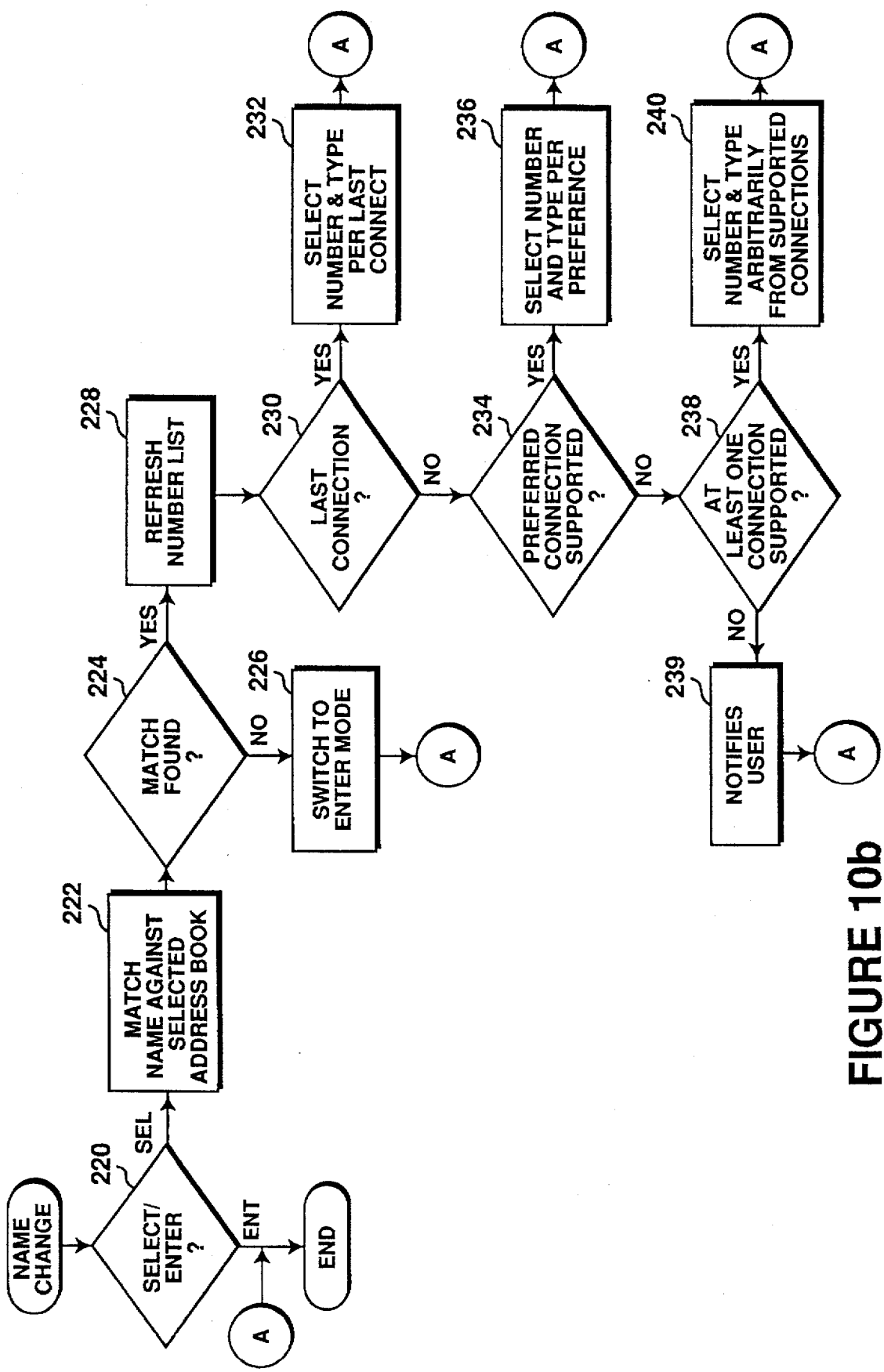

As shown in FIG. 10b, in response to a callee name change event, the connect function determines if it is operating in the select mode, step 220. If the connect function is operating in the enter mode, it takes no further action. However, if the connect function is operating in the select mode, the connect function matches the addressee name entered against the addressees of the selected address book, step 222. If no match was found, the connect function switches to enter mode, step 226. On the other hand, if a match is found, the connect function refreshes the connection number list, step 228.

Next, the connect function checks the connection history log to locate the last connection address used to connect to the matched addressee, step 230. If a last connection address was found, the connect function selects a connection number and type pair based on the last connection made, step 232. If no prior connection was found in the connection history log, the connect function determines if the matched addressee's preferred transport type is supported, step 234. If the preferred transport type is supported, the connect function selects a connection number and type pair based on the matched addressee's preference, step 236. If the matched addressee's preferred transport type is not supported, the connect function determines if at least one of the matched addressee's connection types is supported, step 238. If at least one of the matched addressee's connection type is supported, the connect function selects a connection number and type pair arbitrarily from one of the matched addressee's connection addresses, step 240. Otherwise, the connect function notifies the user that none of the matched addressee's transport types are supported.

Figure 10C:
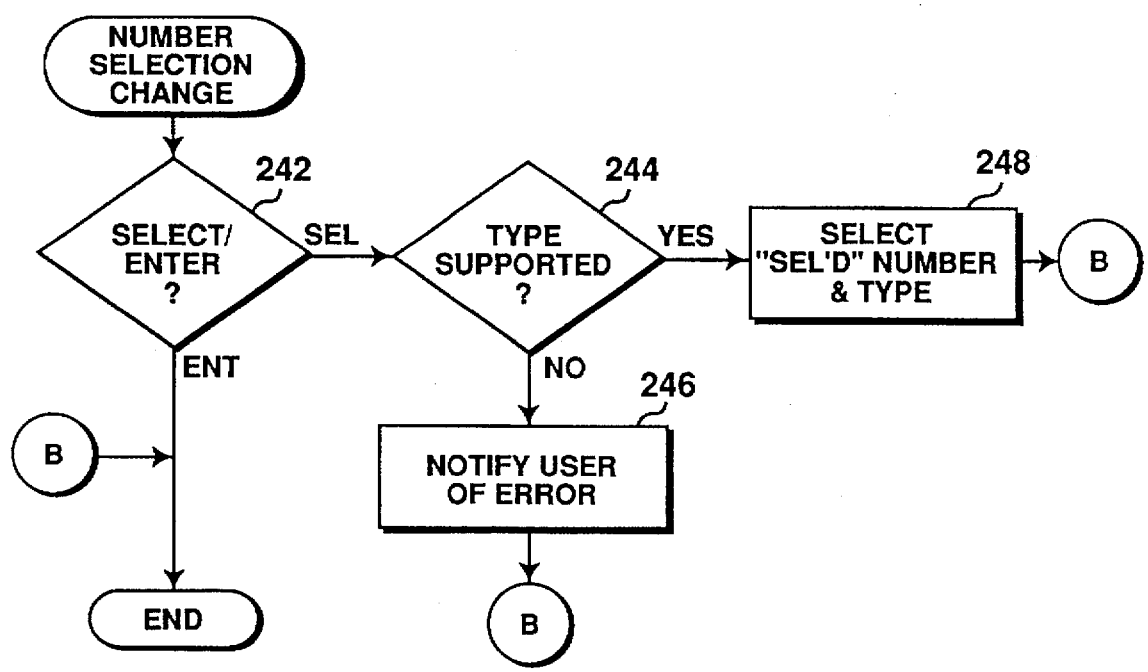

As shown in FIG. 10c, in response to a connection number selection change event, the connect function determines if it is operating in the select mode, step 242. If it is operating in the enter mode, the connect function takes no further action. Otherwise, the connect function determines if the connection type of the user selected connection number is supported, step 244. If the corresponding connection type is not supported, the connect function notifies the user of the error, step 246; otherwise, the connect function selects the user selected connection number and the corresponding connection type, step 248.

Figure 10D:
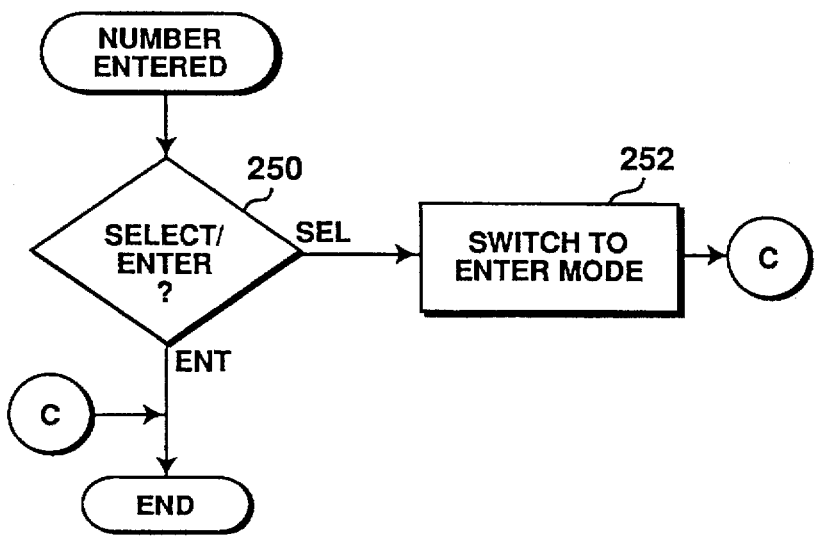

As shown in FIG. 10d, in response to a connection number entry event, the connect function determines if it is operating in the select mode, step 250. If the connect function is operating in the enter mode, the connect function takes no further action; otherwise the connect function switches the operating mode to the enter mode, step 252.

Figure 10E:
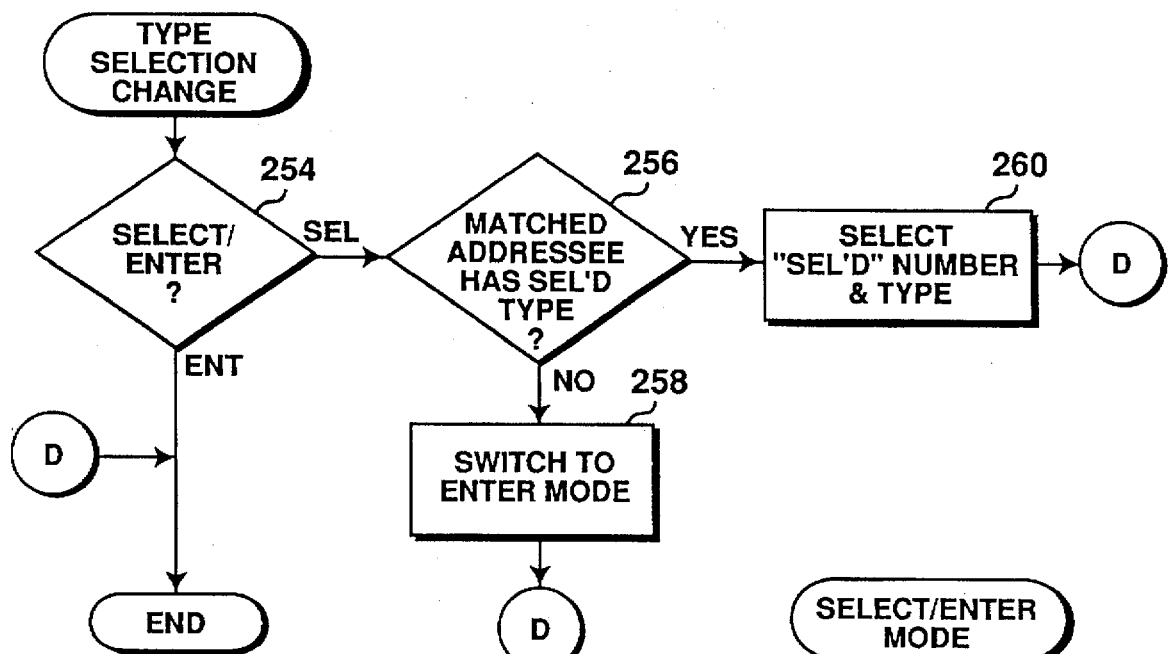

As shown in FIG. 10e, in response to a transport type selection change, the connect function determines if it is operating in the select mode, step 254. If it is operating in the enter mode, the connect function takes no further action, otherwise the connect function further determines if the matched addressee has the user selected transport type, step 256. If the matched addressee does not have the user selected transport type, the connect function switches to enter mode, step 258, otherwise, the connect function selects the user selected connection number and transport type, step 260.

Figure 10F:
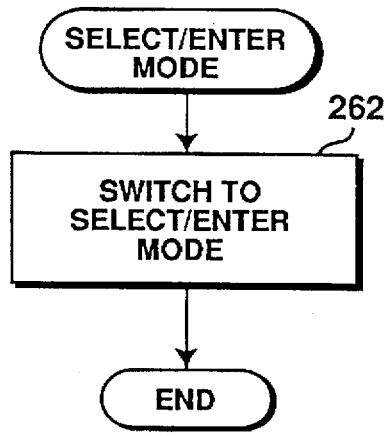
Figure 10G:
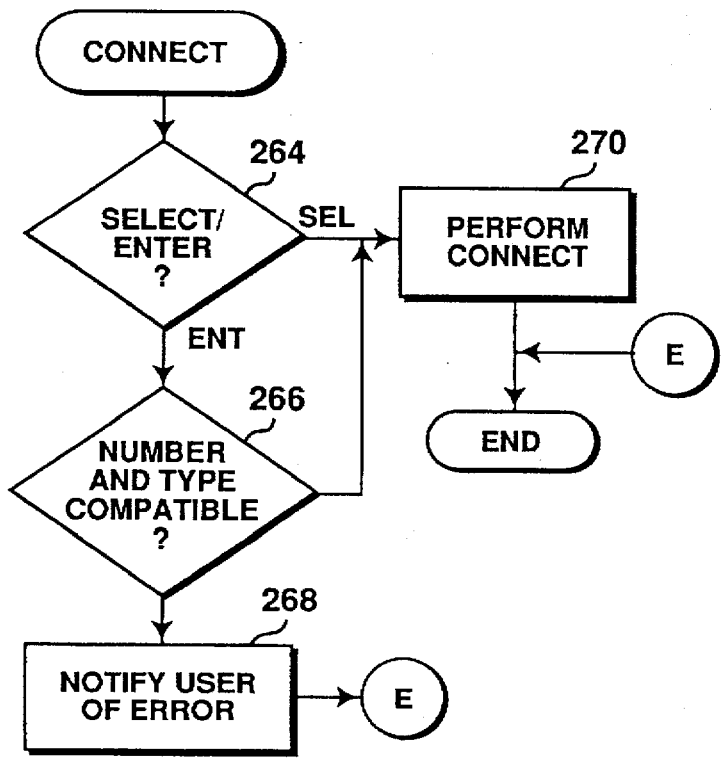

As shown in FIG. 10f, in response to a select/enter mode button event, the connect function switches the operating mode to the user selected select/enter mode, step 260. Lastly, as shown in FIG. 10g, in response to a connect button event, the connect function determines if it is operating in the select mode, step 264. If it is operating in the select mode, the connect function attempts the connection using the selected connection number and transport type, step 270. On the other hand, if the connect function is operating in the enter mode, the connect function further determines if the entered connect number and the user selected transport type are compatible, step 266. If the connect number and transport type are compatible, the connect function also attempts the connection, step 270, otherwise, the connect function notifies the user of the error, step 268.

Thus, a method and apparatus for managing PC conference connection addresses has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A personal computer (PC) conferencing system comprising a conferencing application having a profile function for designating a first shared address book; and a create/edit function for creating and editing a business card data structure with information commonly found in a business card and at least one conference connection address for a user of the PC conferencing application, automatically populating an address record in the first shared address book with the user's at least one conference connection address when the business card data structure is created, and automatically updating the populated address record in the first shared address book whenever the business card data structure is subsequently updated.

2. The PC conferencing system as set forth in claim 1, wherein each of the at least one conference connection address comprises a connection number and a corresponding transport type.

3. The PC conferencing system as set forth in claim 2, wherein the connection number is kept in a location independent form.

4. The PC conferencing system as set forth in claim 3, wherein the conferencing application further includes a connect function for connecting the PC conferencing system to another PC conferencing system for conference, the connect function automatically adding location dependent information and local prefixes to the location independent connection number when attempting the connection.

5. The PC conferencing system as set forth in claim 4, wherein the conferencing application also has a profile including location dependent information and local prefixes to be added to a conference connection address whenever the conference connection address is used in initiate connection to a callee for conference.

6. The PC conferencing system as set forth in claim 1, wherein the first address book is physically located in a storage device of a remote server, and the PC conferencing system further comprises operating system services for mapping the first address book into a logical view of a file system of the PC conferencing system.

7. The PC conferencing system as set forth in claim 1, wherein the first address book is automatically synchronized with other like address books designated in like manners by other PC conferencing systems having similarly constituted conferencing applications.

8. The PC conferencing system as set forth in claim 1, wherein the profile function is further used for designating a second address book;

the conferencing application further includes a sending/receiving function for receiving and saving similar business data structures from other PC conferencing systems into the second address book.

9. A network of computer systems comprising:

a) a first personal computer (PC) having a first conferencing application including a first profile function for designating a first shared address book, and a first create/edit function for creating and editing a first business card data structure with information commonly found in a business card and at least one conference connection address for user of the first personal computer, automatically populating a first address record in the first shared address book with the at least one conference connection address of the user of the first personal computer when the first business card data structure is created, and for automatically updating the first address record in the first shared address book whenever the first business card data structure is subsequently updated; and b) a second personal computer (PC) having a second conferencing application including a second profile function for designating the first shared address book, and a second create/edit function for creating and editing a second business card data structure with information commonly found in a business card and at least one conference connection address for a user of the second personal computer, automatically populating a second address record in the first shared address book with the at least one conference connection address of the user of the second personal computer when the second business card data structure is created, and for updating the second address record in the first shared address book whenever the second business card data structure is subsequently updated.

10. The network of computer systems as set forth in claim 9, wherein each of the at least one conference connection address comprises a connection number and a transport type.

11. The network of computer systems as set forth in claim 10, wherein the connection number is kept in a location independent form.

12. The network of computer systems as set forth in claim 11, wherein the first and second conferencing applications have a first and a second profile including first and second location dependent information and first and second local prefixes respectively, which are to be added to a conference connection address whenever the conference connection address is used to initiate a conferencing connection from the first or the second personal computer.

13. The network of computer systems as set forth in claim 12, wherein the first and the second conferencing applications further include a first and a second connect function for connecting the first and the second PC to other PCs for conference respectively, the first and second connect functions automatically adding first and second location dependent information and first and second local prefixes to a first and a second location independent connection number respectively when attempting to make a first and a second conferencing connection, respectively.

14. The network of computer systems as set forth in claim 9, wherein the first shared address book is physically located in a storage device of a remote server, and the first and the second PC further comprise first and second operating system services for mapping the first shared address book into a first and a second logical view of a first and a second file system of the first and the second PC respectively.

15. The network of computer systems as set forth in claim 9, wherein the network further comprises
c) a third personal computer (PC) having a third conferencing application including a third profile function for designating a second shared address book, and a third create/edit function for creating and editing a third business card data structure with information commonly found in a business card and at least one conference connection address for user of the third personal computer, automatically populating a third address record in the second shared address book with the at least one conference connection address for the user of the third personal computer when the third business card data is created, and for updating the third address record in the second shared address book whenever the third business card data structure is subsequently updated, the first shared address book and the second shared address book are automatically synchronized to each other.

16. The network of computer systems as set forth in claim 15, wherein
the first shared address book is physically located in a first storage device of a first remote server;
the first and the second PC further comprise first and second operating system services for mapping the first shared address book into a first and a second logical view of a first and a second file system of the first and the second PC respectively;
the second shared address book is physically located in a second storage device of a second remote server;
the third PC further comprise third operating system services for mapping the second shared address book into a third logical view of a third file system of the third PC; and
the first and second servers comprise first and second file drivers for automatically synchronizing the first and second shared address books to each other.

17. In a network of computer systems including at least a first and a second computer system each having a computer conferencing application, a method for maintaining conferencing connection addresses throughout the network, the method comprising the steps of:
a) designating a first shared address book by a profile function of the conferencing application of the first computer system and the second computer system;
b) populating a first address record and a second address record in the first shared address book with at least a first conference connection address corresponding to a user of the first computer system and at least a second conference connection address for a user of the second computer system by a create/edit function of the conferencing application of the first computer system and the second computer system when the structure including the first and second conference connection addresses; and
c) updating the first and second address records in the first shared address book by the create/edit function, whenever the create/edit function updates the business card data structures of the first computer system or the second computer system, respectively.

18. The method as set forth in claim 17, wherein each of the at least one conference connection addresses comprise a connection number and a transport type.

19. The method as set forth in claim 18, wherein the connection number is kept in a location independent form.

20. The method as set forth in claim 19, wherein the method further comprises the steps of:
(d) maintaining location dependent information and local prefixes in a local profile by the conferencing application of the first computer system and the second computer system; and
(e) adding the location dependent information and the local prefixes to a conference connection address by a connect function of the conference application, whenever the conference connection address is used to initiate a conference connection.

21. The method as set forth in claim 17, wherein the first shared address book designated in step (a) is physically located in a storage device of a remote server, and step (a) further comprises mapping the first shared address book into a logical view of a file system of the first computer system and the second computer system by operating system services of the first computer system and the second computer system, respectively.

22. The method as set forth in claim 17, wherein
step (a) further comprises designating a second shared address book by the profile function of the conferencing application of a third personal computer;
step (b) further comprises populating a third address record in the second shared address book with at least one conference connection address for a user of the third computer system by the create/edit function of the conferencing application when the create/edit function creates a business card data structure including the at least one conference connection address; and step (c) further comprises updating the third address record by the create/edit function whenever the create/edit function updates the business card data structure corresponding to the user of the third computer system; and the method further comprises step (d) automatically synchronizing the first and second shared address books.

23. The method as set forth in claim 19, wherein the first and second shared address books designated in step (a) are physically located in a first and a second storage device of a first and a second remote server respectively;

step (a) further comprises mapping the first shared address book into a logical view of a file system of the first computer system and the second computer system by operating system services of the first computer system and the second computer system respectively, and mapping the second shared address book into a logical view of a file system of the third computer system by operating system services of the third computer system; and step (d) comprises automatically synchronizing the first and second shared address books to each other by a file driver resident on the first and the second remote servers respectively.

* * * * *